Feb. 20, 1945. W. HARTKOPF 2,369,673
SHEAR
Filed Feb. 17, 1944
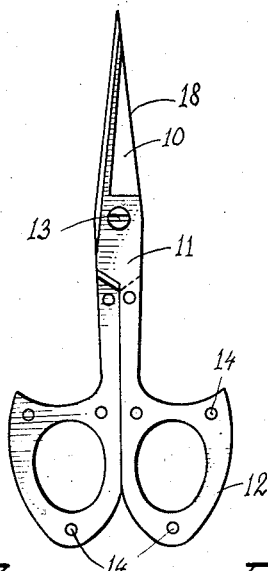
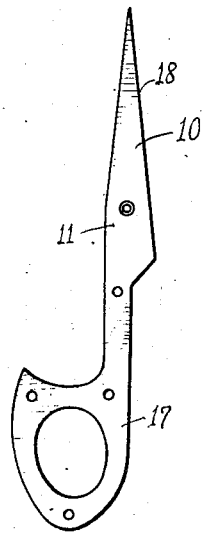
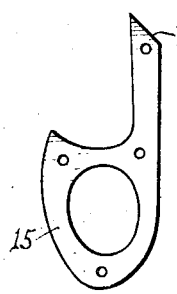
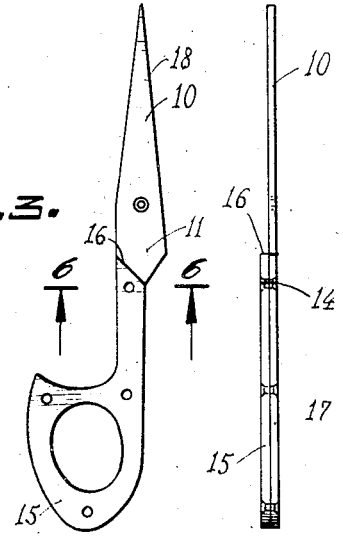
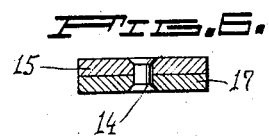
INVENTOR.
William Hartkopf
BY Richards & Geier
ATTORNEYS.

Patented Feb. 20, 1945

2,369,673

UNITED STATES PATENT OFFICE 2,369,673

SHEAR

William Hartkopf, North Bergen, N. J.

Application February 17, 1944, Serial No. 522,691

2 Claims. (Cl. 30—254)

This invention relates to shears and scissors (hereinafter collectively referred to as "shears"), and has for an object the provision of a pair of shears whose blade and handle members and intermediate side portions can be stamped out of appropriate sheet metal in accordance with accepted stamping methods and standards.

A further object is the provision of a pair of shears whose constructional features would lend themselves to faster and cheaper methods of production.

A still further object is the provision of a pair of shears whose constructional features are such that the usual forging operation may be dispensed with in its manufacture.

Another object is the provision of a method of making such shears consisting of stamping its blade and handle members and intermediate side portions out of a sheet of metal.

These and other objects are attained by the simple device of making the blade and handle members and intermediate side portions of four parts instead of the usual two and of riveting each complete unit together. Each of the four parts comprises an element of such shape that it might readily be stamped out in the usual way using the usual stamping means. Heretofore the shoulder at the point where the handle member ends and the intermediate side portion begins has been the stumbling block to efforts directed toward stamping the blade and handle members and intermediate side portions out of sheet metal. This obstacle is eliminated in the device herein disclosed since here the shoulder portion has been made integral with only half of the handle member, this shoulder half being wholly separate and apart from the other half of the handle member which is integral with the intermediate side portion and with the blade member. Each of these parts—the shoulder and shoulder half of the handle on the one hand, and the other half of the handle, intermediate side portion, and blade on the other hand—is of such thickness and such proportions that it can readily be stamped out of an appropriate sheet of metal.

A preferred embodiment of the invention is illustrated in the accompanying drawing in which—

Figure 1 is a side elevation of a small pair of shears (commonly known as scissors) of the construction herein described, the blades being shown in closed position;

Figure 2 is a similar view of one of the two parts hereinabove mentioned, namely, the part comprising the second half of the handle, the intermediate side portion and the blade;

Figure 3 is a similar view of the other of the two parts hereinabove mentioned, namely, the part comprising the shoulder portion and the shoulder half of the handle;

Figure 4 is a similar view of both said parts showing how the part shown in Figure 3 is mounted on and fastened to the part shown in Figure 2;

Figure 5 is a bottom or bottom edge view of the unit shown in Figure 4; and

Figure 6 is an enlarged section on the line 6—6, Figure 4.

The shears shown comprises two pivoted and cooperating members each consisting of one of the two blades 10, one of the two intermediate side portions 11 and one of the two handles 12. The two parts are pivoted together by a rivet or other suitable pivot 13. As shown in Figures 4 and 5 each of these members consists of two parts riveted together by means of rivets 14. The smaller of these parts is shown in Figures 3 and 5 to consist of one half 15 of the handle 12 and the shoulder 16. The bigger of these parts is shown in Figures 2 and 4 to consist of the other half 17 of the handle 12, the intermediate side portion 11 and the blade 10. Handle parts 15 and 17 are substantially identical in every respect constituting, as they do, the two sides of each handle 12.

The unit comprising blade 10, side portion 11 and half 17 of the handle 12 can readily be stamped out of a flat sheet of metal since the unit is itself a substantially flat unit of like thickness throughout (except where the blade is reduced to its cutting edge 18). The unit comprising the shoulder 16 and the half 15 of the handle 12 is also a flat unit of like thickness throughout and can also readily be stamped out of a flat sheet of metal.

It should be noted that handle parts 15 and 16 need not have the same thickness. It is sufficient if part 15 is as thick as shoulder 16 is high—whatever that height may be. In other words part 15 is to be stamped out of a sheet of metal as thick as the shoulder 16 is required to be high.

It is apparent that the invention shown above has been given by way of illustration and not by way of limitation, and that the illustration shown above is capable of wide variation and modification within the scope of the present invention. All of such variations and modifications are to be included within the scope of the present invention.

What is claimed is:

1. A shear comprising two pivoted and cooperating members, each consisting of a blade, an intermediate side portion and a handle, each of said members comprising two substantially flat parts affixed to one another.

2. In a shear of the character described, a handle comprising two substantially flat parts, one of said parts being integral with one of the intermediate side portions and one of the blades and comprising half the handle, the other being integral with the shoulder located at the point where the handle and the intermediate side portion meet, and comprising the other half of the handle, said parts being affixed to one another by means of rivets.

WILLIAM HARTKOPF.